United States Patent
Hogan et al.

(10) Patent No.: US 11,614,864 B2
(45) Date of Patent: Mar. 28, 2023

(54) MANAGED PLACEMENT OF OBJECT COMPONENTS IN AN OBJECT-BASED DATASTORE

(71) Applicant: VMware, Inc., Palo Alto, CA (US)

(72) Inventors: Cormac Hogan, Youghal (IE); Duncan Epping, Helmond (NL); Frank Denneman, Purmerend (NL)

(73) Assignee: VMware, Inc., Palo Alto, CA (US)

( * ) Notice: Subject to any disclaimer, the term of this patent is extended or adjusted under 35 U.S.C. 154(b) by 117 days.

(21) Appl. No.: 17/112,438

(22) Filed: Dec. 4, 2020

(65) Prior Publication Data
US 2022/0179555 A1    Jun. 9, 2022

(51) Int. Cl.
| | |
|---|---|
| G06F 16/00 | (2019.01) |
| G06F 3/06 | (2006.01) |
| G06F 9/451 | (2018.01) |
| G06F 9/455 | (2018.01) |
| G06F 16/11 | (2019.01) |

(52) U.S. Cl.
CPC .......... G06F 3/0604 (2013.01); G06F 3/0631 (2013.01); G06F 3/0676 (2013.01); G06F 3/0679 (2013.01); G06F 9/451 (2018.02); G06F 9/45558 (2013.01); G06F 16/122 (2019.01); *G06F 2009/45583* (2013.01); *G06F 2009/45595* (2013.01)

(58) Field of Classification Search
CPC .... G06F 3/0604; G06F 3/0631; G06F 3/0676; G06F 3/0679; G06F 9/451; G06F 9/45558; G06F 2009/45583; G06F 2009/45595; G06F 16/122
See application file for complete search history.

(56) References Cited

U.S. PATENT DOCUMENTS

| | | | | |
|---|---|---|---|---|
| 9,275,083 | B2 * | 3/2016 | Thakur | G06F 16/122 |
| 10,191,675 | B2 * | 1/2019 | Kottomtharayil | G06F 3/0686 |
| 11,113,246 | B2 * | 9/2021 | Mitkar | G06F 3/0608 |
| 11,238,173 | B2 * | 2/2022 | Iyer | G06F 3/0631 |
| 2012/0109958 | A1 * | 5/2012 | Thakur | G06F 16/122 707/E17.089 |
| 2014/0143217 | A1 * | 5/2014 | Thakur | G06F 16/21 707/694 |
| 2018/0329645 | A1 * | 11/2018 | Guerra Delgado | G06F 16/2365 |
| 2019/0034505 | A1 * | 1/2019 | Renauld | G06F 3/067 |
| 2019/0286360 | A1 * | 9/2019 | Guerra Delgado | G06F 3/0647 |

(Continued)

*Primary Examiner* — Jean M Corrielus
(74) *Attorney, Agent, or Firm* — Dinsmore & Shohl LLP

(57) ABSTRACT

A method for storage management of an object among a plurality of storage devices of a datacenter is provided. The method, in response to receiving an input on a selection item presented through a UI, determines that a manual storage management of an object is selected. The method then receives a storage policy for storing the object. Based on the storage policy, the method defines a plurality of components for the object and determines whether a set of one or more storage resources is available for storing the plurality of components. When the method determines that the set is available, for each component, the method presents the set of storage resources, receives a selection of a storage resource in the set to store the component, and updates the set based on the policy and the selection before presenting the updated set to select from for storing a next component.

15 Claims, 7 Drawing Sheets

(56) References Cited

U.S. PATENT DOCUMENTS

2020/0026340 A1\* 1/2020 Muller .................. G06F 1/3221
2020/0167091 A1\* 5/2020 Haridas .................. G06F 3/067

\* cited by examiner

MANAGED PLACEMENT OF OBJECT COMPONENTS IN AN OBJECT-BASED DATASTORE

BACKGROUND

Distributed systems allow multiple clients in a network to access a pool of shared resources. For example, a distributed storage system, such as a distributed virtual storage area network (vSAN) datastore, allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines, spawned on the host computers may use the datastore, for example, to store objects (e.g., virtual disks) that are accessed by the virtual machines (VMs) during their operations.

A hyper-converged infrastructure (HCI) is a software-defined infrastructure in which the traditional three-tier infrastructure (i.e., compute, storage, and networking) is virtualized in order to reduce complexity and, at the same time, increase scalability. For example, an HCI datacenter, in which storage, compute, and networking elements of the datacenter are virtualized, has significantly higher scalability and less complexity, compared to a conventional (or hardware-defined) datacenter. In an HCI datacenter, an application may run on several different virtual machines or other types of virtual computing instances (VCIs), such as containers, etc.

A VCI may include one or more objects (e.g., virtual disks) that are stored in an object-based datastore (e.g., vSAN) of the datacenter. Each object may include one or more components depending on the storage policy that is defined (e.g., by an administrator) for the object. For example, based on a storage policy that requires high availability for an object, the datastore may define two or more components for the object that are mirrors of each other and distributed across different hosts (e.g., servers). Conversely, if a storage policy requires higher performance, the datastore may specify two or more components for the object that are distributed across different disks. A component may be a part of, or portion of, an object. The different components of an object, also referred to as "object components," may be stored in different storage resources (e.g., one or more physical disks of one or more host machines) of the datastore. The placement of the object components has been conventionally an automatic process that is implemented by the datastore itself (e.g., without any user intervention).

Automatic placement of the object components may negatively affect the performance and/or efficiency of the system. As an example, during a deployment of the VCIs associated, for example, with two different resource intensive applications (e.g., applications that run on highly resource consuming VCIs), the datastore may allocate one or more common storage resources (e.g., host machines, disk groups, disks, etc.) to the objects of the VCIs. Sharing the same physical resource(s) by different applications could negatively affect the performances of the applications.

DETAILED DESCRIPTION

Figure 1:
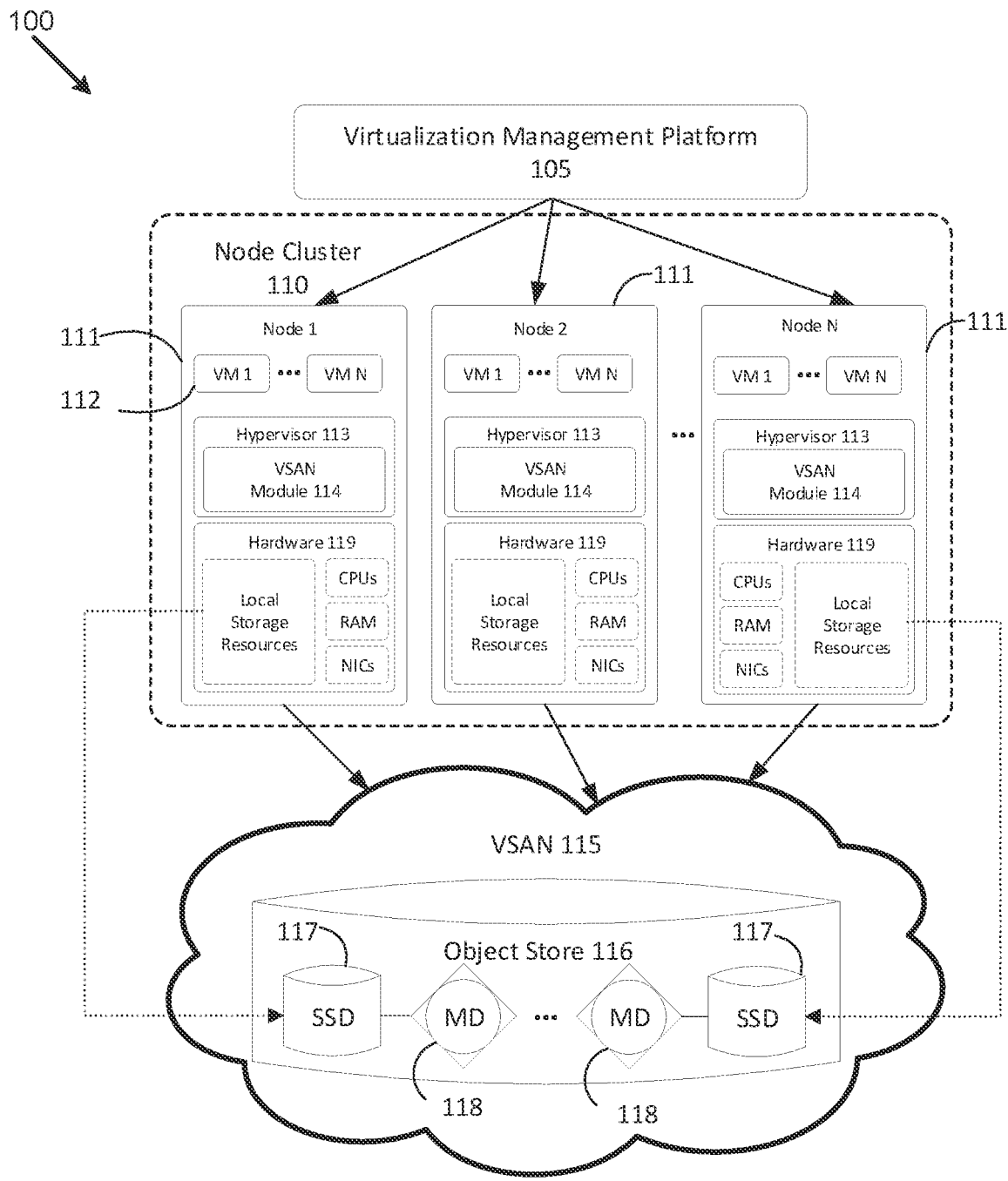
FIG. 1 is a diagram illustrating an example computing environment in which embodiments of the present application may be practiced.

In a distributed object-based datastore, such as vSAN, every object (e.g., a virtual disk of a VM stored as a virtual disk file) may include one or more components depending on the storage policy defined for the object. The storage policy may be defined by a user (e.g., an admin) and may be related to availability and/or performance associated with the object. For example, in some embodiments, a storage policy for an object may include, among other things, a failure to tolerance (FTT) ratio and/or a stripe width (SW) associate with the object. As will be described in more detail below, a stripe width number may define the number of individual disks (or stripes) per object in some embodiments. A failure to tolerance number, in some embodiments, may address the availability requirement and define the number of replica copies of data, for example, to mitigate the risk of a host failure resulting in lost connectivity to data or potential data loss.

As will be discussed in great detail below, in some embodiments, a storage object may be deployed as a redundant array of independent disks (RAID) tree, in which each leaf of the tree may be a component of the object. For example, if a storage policy defined for a virtual machine disk (VMDK) file includes a stripe width of 2 with no tolerance for failure (e.g., FTT=0 and SW=2), a RAID-0 stripe may be configured for the VMDK across a minimum of two individual disks. In this example, the VMDK may be the object, and each of the stripes may be a component of that object. As another example, if the storage policy specifies, for a VMDK, a tolerance of at least one failure in a storage cluster, with a stripe width of one (e.g., FTT=1 and SW=1), a RAID-1 mirror for the VMDK object may be created with one (mirror) component on one host machine of the cluster and another (mirror) component on a different host machine of the cluster.

As described, automatic placement of the object components associated with one or more VMs by a datastore may negatively affect the performance of applications running on those VMs. As an example, when a client (e.g., of the datacentre) adds a new storage resource (e.g., a host machine, a disk group, or an individual physical disk) to an HCI storage cluster, a subsequent deployment of VMs may result in all, or most, of the object components associated with those VMs being stored on the same storage resource (e.g., instead of the components being distributed throughout the cluster). This may result in the storage resource becoming a bottleneck for the system, for example, when specific operations are implemented on such a deployment of VMs.

It should be noted that although the disclosure is described mostly with reference to VMs, the embodiments described herein may also apply to other types of virtual computing instances (VCIs), such as containers, Docker containers, data compute nodes, isolated user space instances, namespace containers, and the like.

Normally, with object components distributed around the storage system, the load may be shared across different storage resources, such as host machines and physical disks. However, in some cases, such as adding new hardware to the storage cluster, or deploying highly intensive applications, automatic placement of object components may not be desirable. Currently, a client (e.g., of a datacentre) is not able to choose the exact placement of components when deploying, for example, a new virtual machine or virtual machine disk in a distributed object-based datastore. In other words, the client has no control over the placement of the components that make up an object.

Accordingly, some embodiments provide a mechanism which enables manual placement of the components of an object, for example, in an HCI datacenter. The manual placement of the components, in some such embodiments, may be storage policy driven. That is, a user (e.g., an admin) may determine where each component of an object should be placed in a datastore based on a storage policy that was previously defined for the object. In some embodiments, a user may select (unique) capacity devices, disk groups, and host machines of a datastore across which the object components may be deployed. In some embodiments, the datastore may have a built-in checking process that validates the defined policy (e.g., determines that the policy is achievable and does not impact the overall health of the system).

In some embodiments, when a user starts creating a new object in a datastore (e.g., provisioning a new VM in vSAN), the datastore may ask (e.g., by the datastore) whether the user wishes to deploy the object components automatically or manually. Once the user selects manual deployment for the object components, the user may be asked to define a storage policy for the object. After receiving the storage policy definition from the user, the datastore may check the policy against the available resources of the datastore. After the storage policy is validated, the user may be provided, based on the storage policy, with a list of storage resources from the available resources to place the components. When an object is made up of multiple components (e.g., based on the storage policy), the next component of the object may be offered only storage resources that do not deviate from the storage policy defined by the user. Such object provisioning process may be continued until all components associated with the object are provisioned within the datastore.

As an example, if the storage policy stipulates some high availability characteristic for an object, such as RAID-1, then the datastore may determine that the components of the object cannot be placed on the same physical server (or host machine). As a result, the server chosen for the first component of the object may not be offered as a host for subsequent components of the object. Conversely, if the storage policy stipulates some high performance characteristic for an object, such as having a stripe width of two or more, then the datastore may determine that the components of the object cannot be placed on the same physical disk. As such, the disk drive chosen for the first component may not be offered as a disk drive for subsequent components of the object.

In some embodiments, the user may be provided with an option (e.g., after the manual placement of the components) to specify whether the placement of the component(s) can be changed in the future, for example, in a potential future load balancing process. In some such embodiments, if the user selects not to change the placement of a component, the datastore may not move the placed component to any other storage resource during any future load balancing process (or a similar process that may cause movement of the components). In some other embodiments, the user (e.g., an admin) may allow future movement of one or more placed components in between a particular set of storage resources among all of the available storage resources.

The above described manual object placement may have other use cases. For example, many container-based (or containerized) applications have a built-in protection mechanism and do not require protection from the underlying storage. The above described manual placement of the object components may allow the creation and placement of an object (e.g., a VMDK) for such containerized applications that meets the requirement of not having multiple copies of the data on the same storage resource, which may result in a single failure (e.g., of the host) taking down the application. As another example, when a client mirrors application data, for example, within a guest operating system of a VM, the client may like to control the placement of the VMDKs, such that their components do not reside on the same host machine. The above described mechanism of manual component placement may make it possible to have the application and the VM remain available even during a host machine failure.

FIG. 1 is a diagram illustrating an example computing environment 100 in which embodiments of the present application may be practiced. As shown, computing environment 100 includes a distributed object-based datastore, such as a software-based "virtual storage area network" (vSAN) environment that leverages the commodity local storage housed in or directly attached (hereinafter, use of the term "housed" or "housed in" may be used to encompass both housed in, or otherwise directly attached) to host machines/servers or nodes 111 of a storage cluster 110 to provide an aggregate object store 116 to virtual machines (VMs) 112 running on the nodes. The local commodity storage housed in the nodes 111 may include one or more of solid state drives (SSDs) or non-volatile memory express (NVMe) drives 117, magnetic or spinning disks or slower/cheaper SSDs 118, or other types of storages.

In certain embodiments, a hybrid storage architecture may include SSDs 117 that may serve as a read cache and/or write buffer (e.g., also known as a performance/cache tier of a two-tier datastore) in front of magnetic disks or slower/cheaper SSDs 118 (e.g., in a capacity tier of the two-tier datastore) to enhance the I/O performances. In certain other embodiments, an all-flash storage architecture may include, in both performance and capacity tiers, the same type of storage (e.g., SSDs 117) for storing the data and performing the read/write operations. Additionally, it should be noted that SSDs 117 may include different types of SSDs that may be used in different layers (tiers) in some embodiments. For example, in some embodiments, the data in the performance tier may be written on a single-level cell (SLC) type of SSD, while the capacity tier may use a quad-level cell (QLC) type of SSD for storing the data. In some embodiments, each node 111 may include one or more disk groups (e.g., as described below with reference to FIG. 5) with each disk group having one cache storage (e.g., one SSD 117) and one or more capacity storages (e.g., one or more magnetic disks and/or SSDs 118).

As further discussed below, each node 111 may include a storage management module (referred to herein as a "vSAN module") in order to automate storage management workflows (e.g., create objects in the object store, etc.) and provide access to objects in the object store (e.g., handle I/O operations on objects in the object store, etc.) based on predefined storage policies specified for objects in the object store. For example, because a VM may be initially configured by an administrator to have specific storage requirements (or policy) for its "virtual disk" depending on its intended use (e.g., capacity, availability, performance or input/output operations per second (IOPS), etc.), the administrator may define a storage profile or policy for each VM specifying such availability, capacity, performance and the like. As further described below, the vSAN module may then create an "object" for the specified virtual disk by backing it with physical storage resources of the object store based on the defined storage policy.

A virtualization management platform 105 is associated with cluster 110 of nodes 111. Virtualization management platform 105 enables an administrator to manage the configuration and spawning of the VMs on the various nodes 111. As depicted in the embodiment of FIG. 1, each node 111 includes a virtualization layer or hypervisor 113, a vSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding vSAN module 114, may provide access to storage resources located in hardware 119 (e.g., SSDs 117 and magnetic disks 118) for use as storage for storage objects, such as virtual disks (or portions thereof) and other related files that may be accessed by any VM 112 residing in any of nodes 111 in cluster 110.

In one embodiment, vSAN module 114 may be implemented as a "vSAN" device driver within hypervisor 113. In such an embodiment, vSAN module 114 may provide access to a conceptual "vSAN" 115 through which an administrator can create a number of top-level "device" or namespace objects that are backed by object store 116. For example, during creation of a device object, the administrator may specify a particular file system for the device object (such device objects may also be referred to as "file system objects" hereinafter) such that, during a boot process, each hypervisor 113 in each node 111 may discover a /vsan/ root node for a conceptual global namespace that is exposed by vSAN module 114. By accessing APIs exposed by vSAN module 114, hypervisor 113 may then determine all the top-level file system objects (or other types of top-level device objects) currently residing in vSAN 115.

When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through vSAN 115 may, for example, be implemented to emulate the semantics of a particular file system, such as a distributed (or clustered) virtual machine file system (VMFS) provided by VMware Inc. VMFS is designed to provide concurrency control among simultaneously accessing VMs. Because vSAN 115 supports multiple file system objects, it is able to provide storage resources through object store 116 without being confined by limitations of any particular clustered file system. For example, many clustered file systems may only scale to support a certain amount of nodes 111. By providing multiple top-level file system object support, vSAN 115 may overcome the scalability limitations of such clustered file systems.

As described in further detail in the context of FIG. 2 below, a file system object may, itself, provide access to a number of virtual disk descriptor files accessible by VMs 112 running in cluster 110. These virtual disk descriptor files may contain references to virtual disk "objects" that contain the actual data for the virtual disk and are separately backed by object store 116. A virtual disk object may itself be a hierarchical, "composite" object that is further composed of "components" (again separately backed by object store 116) that reflect the storage requirements (e.g., capacity, availability, IOPs, etc.) of a corresponding storage profile or policy generated by the administrator when initially creating the virtual disk. Each vSAN module 114 (through a cluster level object management or "CLOM" sub-module, in embodiments as further described below) may communicate with other vSAN modules 114 of other nodes 111 to create and maintain an in-memory metadata database (e.g., maintained separately but in synchronized fashion in the memory of each node 111) that may contain metadata describing the locations, configurations, policies and relationships among the various objects stored in object store 116.

This in-memory metadata database is utilized by a vSAN module 114 on a node 111, for example, when a user (e.g., an administrator) first creates a virtual disk for a VM as well as when the VM is running and performing I/O operations (e.g., read or write) on the virtual disk. As further discussed below in the context of FIG. 3, vSAN module 114 (through a distributed object manager or "DOM" sub-module, in some embodiments, as further described below) may traverse a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site may be performed through a network, such as a wide area network ("WAN").

Figure 2:
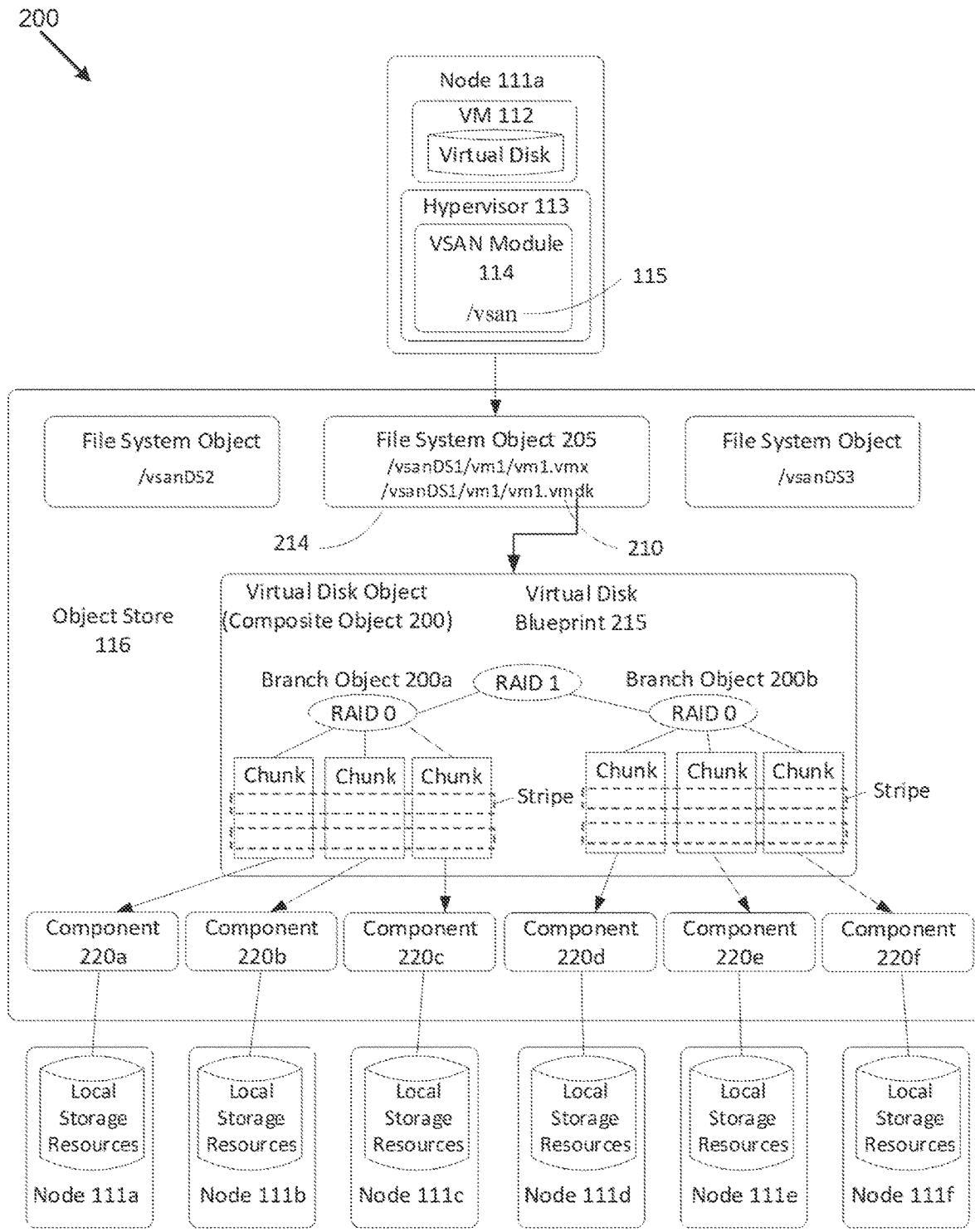
FIG. 2 is a diagram illustrating an example hierarchical structure of objects organized within an object store that represent a virtual disk, according to an example embodiment of the present application.

FIG. 2 is a diagram 200 illustrating an example hierarchical structure of objects organized within an object store 116 that represent a virtual disk, according to an example embodiment of the present application. As previously discussed above, a VM 112 running on one of nodes 111 may perform I/O operations on a virtual disk that is stored as a hierarchical composite object 200 in object store 116. Hypervisor 113 may provide VM 112 access to the virtual disk by interfacing with the abstraction of vSAN 115 through vSAN module 114 (e.g., by auto-mounting the top-level file system object 214 corresponding to the virtual disk object 200). For example, vSAN module 114, by querying its local copy of the in-memory metadata database, may be able to identify a particular file system object 205 (e.g., a VMFS file system object in one embodiment, etc.) stored in vSAN 115 that may store a descriptor file 210 for the virtual disk.

Descriptor file 210 may include a reference to composite object 200 that is separately stored in object store 116 and conceptually represents the virtual disk (and thus may also be sometimes referenced herein as a virtual disk object). Composite object 200 may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

Depending on the desired storage policy (e.g., desired level of fault tolerance or performance efficiency), a virtual disk blueprint 215 may direct data corresponding to composite object 200 to be stored in the datastore in a variety of ways. As described, the storage policy may be defined as failure to tolerance (FTT) ratio and/or a stripe width (SW) numbers associate with an object. FIG. 2 shows (composite) object 200 that includes a virtual disk blueprint 215 describing a RAID 1 configuration where two mirrored copies of the virtual disk (e.g., mirrors) are each further striped in a RAID 0 configuration. In an example, the storage policy for VMDK 200 is defined as having a failure to tolerance of one (FTT=1) and a stripe width of three (SW=3).

Figure 4:
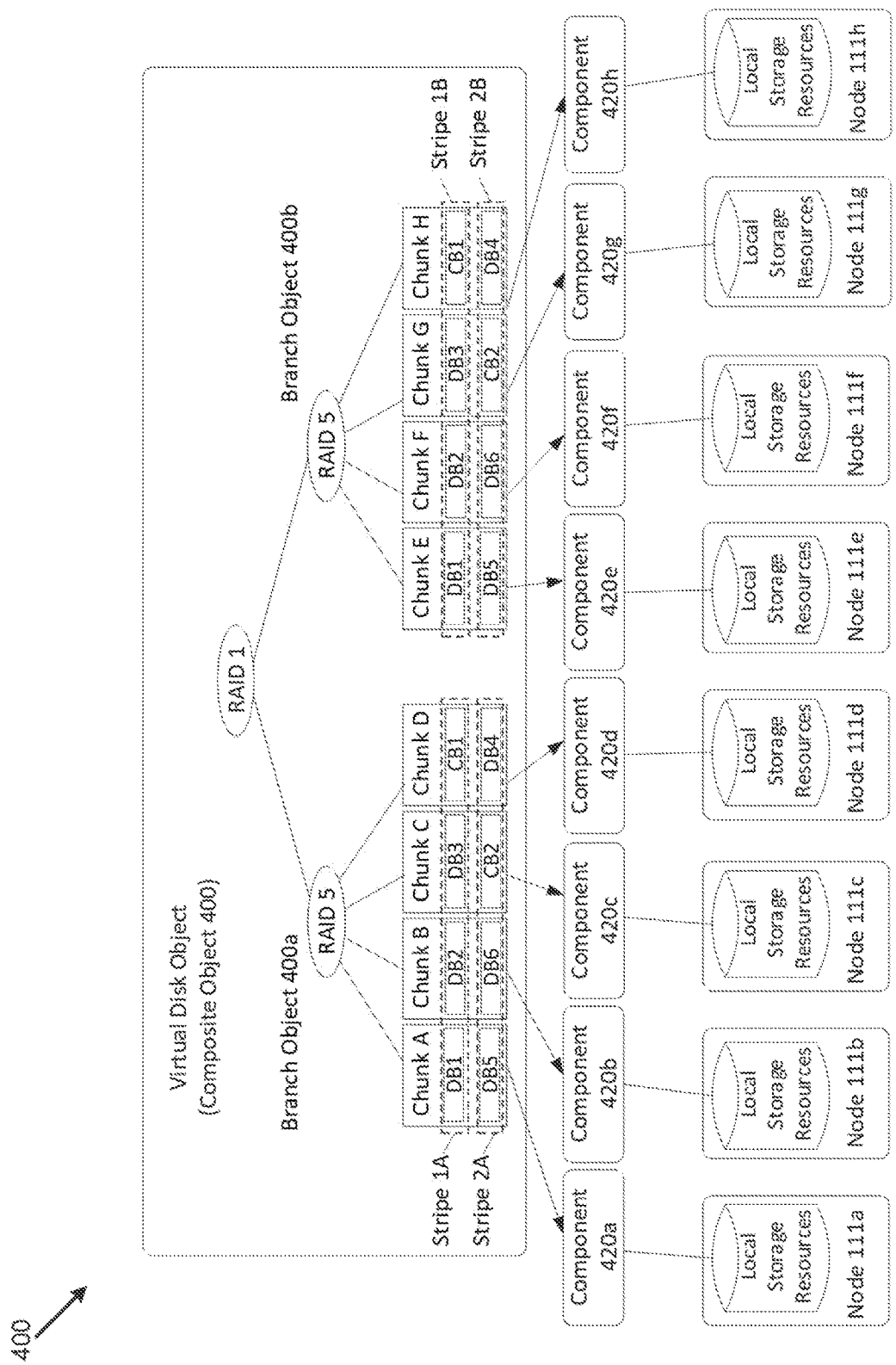
FIG. 4 is a diagram illustrating composite objects of the vSAN being erasure coded and partitioned into multiple stripes, according to an example embodiment of the present application.

Data striping, in some embodiments, may refer to segmenting logically sequential data, such as a virtual disk. Each stripe may contain a plurality of data blocks (e.g., DB1, DB2, DB3 in stripe 1 of composite object 400, as shown in FIG. 4). In some cases, as illustrated in FIG. 4, each stripe may also include one or more code blocks (e.g., RAID 5 or RAID 6). As shown, the stripes are then split vertically into different groups of blocks, referred to as chunks, where each chunk is logically represented as a "leaf" or "component" to which composite object 200 may contain a reference.

The metadata accessible by vSAN module 114 in the in-memory metadata database for each component 220 provides a mapping to or otherwise identifies a particular node 111 in cluster 110 that houses the physical storage resources (e.g., magnetic disks or slower/cheaper SSD 118, etc.) that actually store the chunk (as well as the location of the chunk within such physical resource).

Figure 3:
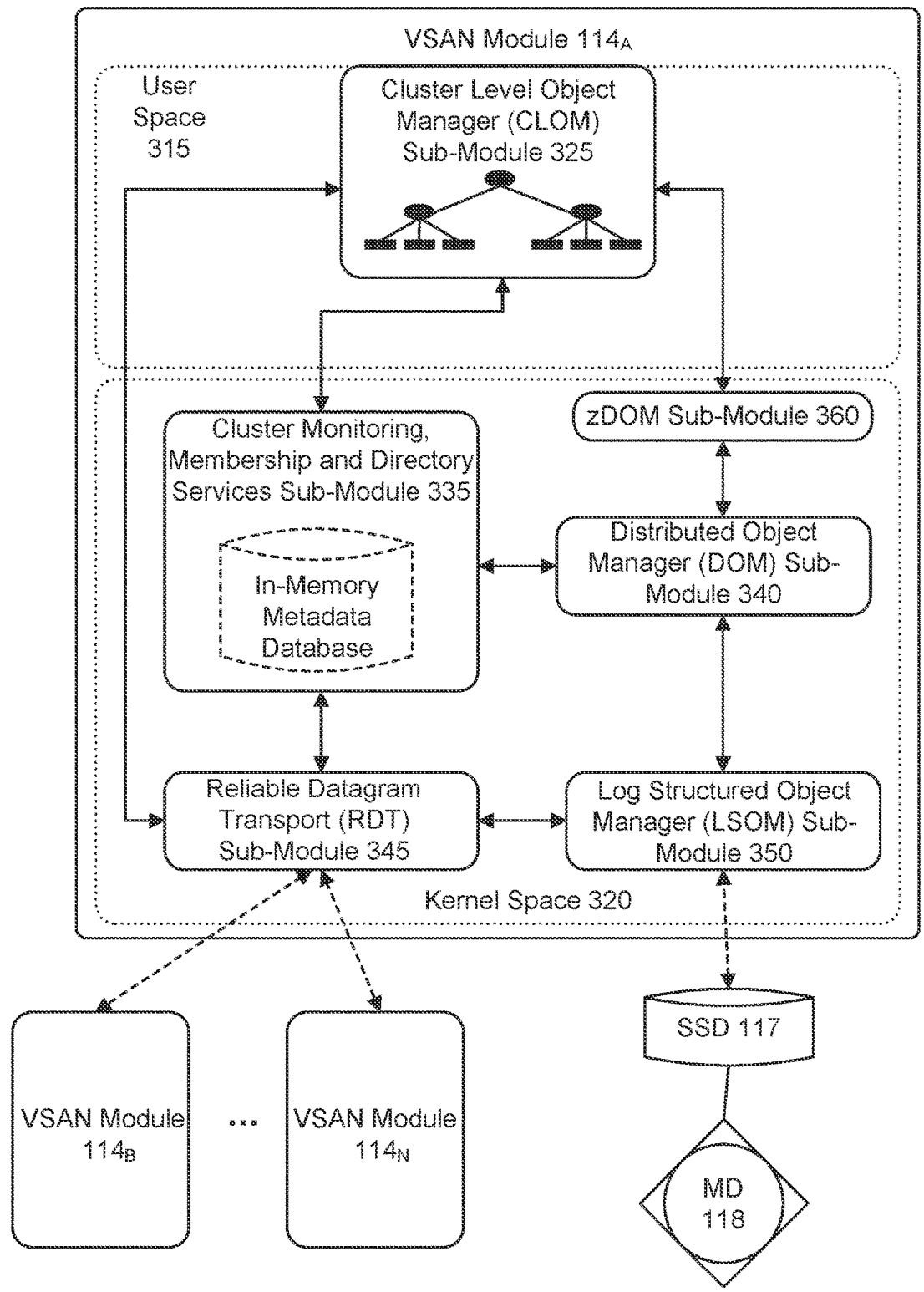
FIG. 3 is a diagram illustrating different components of a vSAN module, according to an example embodiment of the present application.

FIG. 3 is a diagram 300 illustrating different components of a vSAN module, according to an example embodiment of the present application. As previously described, in certain embodiments, vSAN module 114 may execute as a device driver exposing an abstraction of a vSAN 115 to hypervisor 113. Various sub-modules of vSAN module 114 handle different responsibilities and may operate within either user space 315 or kernel space 320 depending on such responsibilities. As depicted in the embodiment of FIG. 3, vSAN module 114 includes a cluster level object manager (CLOM) sub-module 325 that operates in user space 315. CLOM sub-module 325 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by a user to the storage profile or policy relating to an object or when changes to the cluster or workload result in an object being out of compliance with a current storage profile or policy.

In one embodiment, if a user creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, may be responsible for generating blueprint 215 describing the RAID 1/RAID 0 configuration for virtual disk object 200 in FIG. 2 when the virtual disk was first created by the user. As previously discussed, a storage policy may specify requirements for capacity, IOPS, availability, and reliability. Storage policies may also specify a workload characterization (e.g., random or sequential access, I/O request size, cache size, expected cache hit ration, etc.).

Additionally, the user may also specify an affinity to vSAN module 114 to preferentially use certain nodes 111 (or the local disks housed therein). For example, when provisioning a new virtual disk for a VM, a user may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 may consult the in-memory metadata database maintained by its vSAN module 114 to determine the current state of cluster 110 in order to generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340, for example, through zDOM sub-module 360. The DOM sub-module 340 may interact with object store 116 to implement the blueprint by, for example, allocating or otherwise mapping components (e.g., chunks) of the composite object to physical storage locations within various nodes 111 of cluster 110.

In some embodiments, as will be described in more detail below, zDOM sub-module 360 may instruct the DOM module 340 to preliminarily store the data received from the higher layers (e.g., from a VM) in a separate log object on persistent media and a physical memory (e.g., a bank). Once the size of the stored data in the bank reaches a threshold size (e.g., the stripe size), zDOM sub-module 360 may instruct the DOM module to flush the data stored in the bank onto one or more disks (e.g., of one or more host machines). zDOM sub-module 360 may do this full stripe writing to minimize the write amplification effect. In some embodiments, as described below, zDOM sub-module 360 may also modify data compression, hash calculation, data encryption, and other datastore operations to decrease the CPU cost and network and disk write bandwidth.

In addition to CLOM sub-module 325 and DOM sub-module 340, as further depicted in FIG. 3, vSAN module 114 may also include a cluster monitoring, membership, and directory services (CMMDS) sub-module 335 that maintains the previously discussed in-memory metadata database to provide information on the state of cluster 110 to other sub-modules of vSAN module 114 and also tracks the general "health" of cluster 110 by monitoring the status, accessibility, and visibility of each node 111 in cluster 110. The in-memory metadata database may serve as a directory service that maintains a physical inventory of the vSAN environment, such as the various nodes 111, the storage resources in the nodes 111 (SSD, NVMe drives, magnetic disks, etc.) housed therein and the characteristics/capabilities thereof, the current state of the nodes 111 and their corresponding storage resources, network paths among the nodes 111, and the like.

As previously discussed, in addition to maintaining a physical inventory, the in-memory metadata database may further provide a catalog of metadata for objects stored in object store 116 (e.g., what composite and components exist, what components belong to what composite objects, which nodes serve as "coordinators" or "owners" that control access to which objects, quality of service requirements for each object, object configurations, the mapping of objects to physical storage locations, etc.). As previously discussed, other sub-modules within vSAN module 114 may access CMMDS sub-module 335 (represented by the connecting lines in FIG. 3) for updates to learn of changes in cluster topology and object configurations.

For example, as previously discussed, during virtual disk creation, CLOM sub-module 325 may access the in-memory metadata database to generate a virtual disk blueprint, and in order to handle an I/O operation from a running VM 112, DOM sub-module 340 may access the in-memory metadata database to determine the nodes 111 that store the components (e.g., chunks) of a corresponding composite object (e.g., virtual disk object) and the paths by which those nodes are reachable in order to satisfy the I/O operation. In some embodiments, some or all of the metadata catalog (e.g., the mapping of the object to physical storage locations, etc.) may be stored with the virtual disk object 200 in the object store 116.

As previously discussed, DOM sub-module 340, during the handling of I/O operations as well as during object creation, may control access to, and may handle operations on, those components in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network (e.g., local area network (LAN), or WAN) with a different DOM sub-module 340 in a second node 111 (or nodes) that serves as the coordinator for the particular component (e.g., chunk, etc.) of the virtual disk object that is stored in the local storage of the second node 111 (or nodes) and which is the portion of the virtual disk that is subject to the I/O operation.

If the VM issuing the I/O operation resides on a node 111 that is also different from the coordinator of the virtual disk object, the DOM sub-module 340 of the node running the VM may also have to communicate across the network (e.g., LAN or WAN) with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 may also similarly communicate amongst one another during object creation (and/or modification). For example, a virtual disk blueprint generated by CLOM module 325 during creation of a virtual disk may include information that designate which nodes 111 should serve as the coordinators for the virtual disk object, as well as its corresponding components. The DOM sub-modules 340 for such designated nodes may be issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 may interact with a local storage object manager (LSOM) sub-module 350 that serves as the component in vSAN module 114 that may actually drive communication with the local SSDs and magnetic disks of its node 111. In addition to allocating local storage for components (as well as storing other metadata, such as policies and configurations for composite objects for which its node serves as coordinator, etc.), LSOM sub-module 350 may additionally monitor the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 may be used, for example, when DOM sub-modules 340 communicate with one another, as previously discussed above, to create objects or to handle I/O operations. In certain embodiments, RDT module 345 may interact with CMMDS module 335 to resolve the address of logical endpoints dynamically in order to maintain up-to-date location information in the in-memory metadata database, as well as to create, remove, or reestablish connections based on link health status. For example, if CMMDS module 335 reports a link as unhealthy, RDT sub-module 345 may drop the connection in favor of a link in better condition.

In some cases, one or more nodes 111 within node cluster 110 may fail or go offline, resulting in a loss of the data and/or code blocks stored by such nodes. In such cases, the distributed storage system or vSAN environment 100 may have to be able to tolerate such a failure and efficiently reconstruct the missing data blocks. In some other cases, a node 111 may go offline temporarily and then come back online resulting in some out-of-sync data blocks. To address such cases, the distributed storage system may be configured with fault tolerance technologies to resync such out-of-sync data and/or code blocks. Accordingly, to increase performance efficiency and fault tolerance, distributed storage systems (e.g., vSAN environment 100) may implement a variety of fault tolerance technologies, such as the various levels of RAID and/or erasure coding, etc. As described above in relation to FIG. 2, depending on the required level of performance and fault tolerance, virtual disk blueprint 215 may direct composite object 200 to be distributed in one of several ways. In some embodiments, one or a combination of RAID levels (e.g. RAID 0 to RAID 6) may be used, where each RAID level or a combination thereof may provide a different level of fault tolerance and performance enhancement.

Referring back to FIG. 2, for example, FIG. 2 illustrates an example of the application of RAID 1, which entails creating a replica of composite object 200. This is to ensure that a second copy (e.g., branch object 200*b*) of composite object 200 is still available if a first copy (e.g., branch object 200*a*) is lost due to some sort of failure (e.g. disk failure etc.). In some embodiments, some objects may require a more robust fault tolerance system (e.g., depending on their level of importance). For example, in one embodiment, the vSAN datastore may store the metadata object (in the performance tier) in a three-way mirror format (e.g., on at least three different disks).

In addition to RAID 1, FIG. 2 also illustrates the application of RAID 0 to the two copies of composite object 200 (branch object 200*a* and branch object 200*b*, created as a result of RAID 1). Under RAID 0, each copy of composite object 200 may be partitioned into smaller data stripes, where each stripe is further segmented into a number of data blocks (e.g., DB1, DB2, DB3, in the first stripe, and DB4, DB5, DB6, in the second stripe, with reference to FIG. 4) and distributed across local storage resources of various nodes in the datastore. In some cases, striping a copy of composite object 200 over local storage resources of various nodes may enhance performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data may increase the probability of failure, and thus data loss.

To achieve an even higher level of fault tolerance with much less space usage than RAID 1, erasure coding is applied in some embodiments. Erasure coding (EC) is a method of data protection in which each copy of composite object 200 is partitioned into stripes, expanded and encoded with redundant data pieces, and stored across different nodes of the datastore. For example, a copy of composite object 200 is organized or partitioned into stripes, each of which is broken up into N equal-sized data blocks. Erasure codes are then used to encode an additional M equal-sized code block(s) (interchangeably referred to as "parity blocks") from the original N data blocks, where N is a larger number than M.

The M equal-sized code block(s) then provide fault tolerance and enable reconstruction of one or more lost data blocks in the same stripe should one or more of the underlying nodes fail. More specifically, each code block includes parity values computed from the N data blocks in the same stripe using an erasure coding algorithm. An application of an exclusive OR (i.e., XOR) operation to the N data blocks of the stripe, for computing a code block, is one example of applying an erasure coding algorithm, in which case the computed code block contains the XOR of data corresponding to the N data blocks in the stripe. In such an example, if one of the N data blocks is lost due a failure of its underlying node, the datastore object may be able to be reconstructed by performing an XOR operation of the remaining data blocks as well as the computed code block(s) in the same stripe. Depending on the level of fault tolerance desired, different erasure codes are applied in creating the one or more M code blocks. RAID 5 and RAID 6 are common examples of applying erasure coding. In RAID 5, an exclusive OR (i.e. XOR) operation is performed on multiple data blocks to compute a single parity block. An example of the application of RAID 5 in a distributed storage system is illustrated in FIG. 4.

FIG. 4 is a diagram 400 illustrating composite objects of the vSAN being erasure coded and partitioned into multiple stripes, according to an example embodiment of the present application. More specifically, FIG. 4 shows each copy of composite object 400 (i.e., branch object 400*a* and branch object 400*b*) being erasure coded with a 3+1 ratio, such that each copy is partitioned into multiple stripes (e.g. stripes 1A-NA, stripes 1B-NB), where each stripe is further broken up into 3 data blocks (N) and 1 code block (M). As shown, the stripes are then split vertically into different groups of blocks, referred to as chunks, where each chunk is logically represented as a component (e.g., component 420*a*) to which composite object 400 contains a reference. As described above, the metadata for each component then provides a mapping to or otherwise identifies a particular node 111 that has been selected for storing the chunk of blocks corresponding to the component. Accordingly, each chunk of composite object 400 is stored in a different node (e.g. node 111*a* through node 111*f*) based on the mapping of its corresponding component to the node.

The (3+1) EC ratio, described above, is merely an example and is not intended to limit the scope of the present disclosure. For example, under RAID 5, a smaller or larger number of data blocks, such as 2, 4, 5 or 6 or 10 data blocks, may be used to generate a single code block, resulting in EC ratios of (2+1), (4+1), (5+1), (6+1), or (10+1), etc., respectively. In addition, in some embodiments, each data or code block includes 1 MB of data such that each data stripe comprises 3 MB of data. In other embodiments, the data or code blocks may have other sizes, ranging from 0.1 MB to 10 GB, or higher.

As described above with reference to FIG. 1, in some embodiments, a vSAN datastore may include a two-tier datastore with the first tier (also known as performance tier or cache tier) serving as a read cache and/or write buffer, and the second tier (also known as capacity tier) for storing less often accessed data (or cold data). In some embodiments, the cache tier may include faster storage devices, such as SSDs 117 (as shown in FIG. 1), while the capacity tier may include magnetic disks or slower/cheaper SSDs 118 to enhance the I/O performance. In some embodiments, an all-flash storage architecture may include, in both cache and capacity tiers, the same type of storage (e.g., SSDs 117) for storing the data and performing the read/write operations. In some embodiments, one disk from the cache tier and one or more disks from the capacity tier may comprise a disk group for storing the object components.

Figure 5:
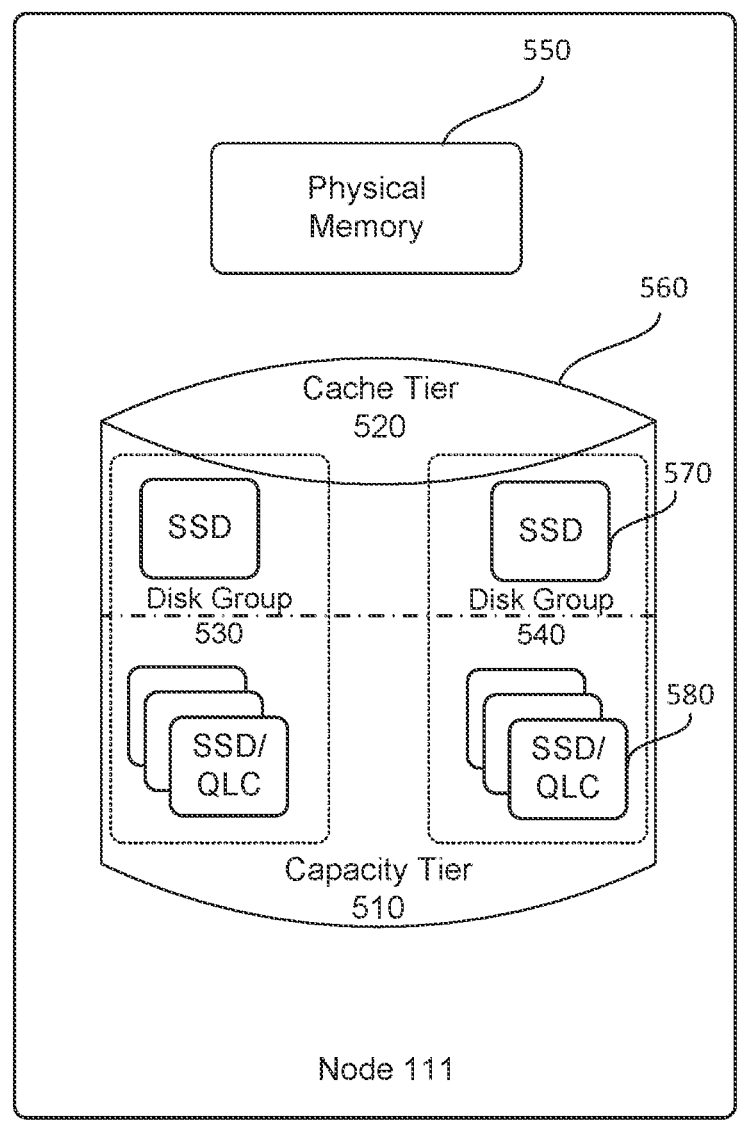
FIG. 5 illustrates different types of storage resources within a node (or host machine), according to an example embodiment of the present application.

FIG. 5 illustrates different types of storage resources within a node (or host machine) 111, according to an example embodiment of the present application. Specifically, as shown in FIG. 5, node 111 may include at least a physical memory 550, as well as a plurality of physical disks 560. As shown, in some embodiments, the plurality of physical disks 560 may be divided into cache tier disks 570 and capacity tier disks 580. Additionally, the plurality of physical disks 560 may be divided into different disk groups, such as disk group 530, which includes one cache tier disk 570 and multiple (e.g., up to seven in some embodiments) capacity tier disks 580, and disk group 540, which also includes one cache tier disk 570 and multiple capacity tier disks 580. Each disk group 530 or 540 may be a logical construct that manages the relationship between capacity tier disks and their corresponding cache tier disk.

As discussed, cache tier disks 570 may include at least one fast SSD 570 for the purpose of read caching and write buffering, and capacity tier disks 580 may include at least one fast SSD and/or slower TLC, QLC, or other types of SSDs for persistent storage. Access to data stored in the cache tier may be substantially faster than access to data stored in the capacity tier. The datastore may use one or several different algorithms and/or parameters to determine when and how the data in a cache tier disk should be flushed (or de-staged) to capacity tier disk(s). Also, as described, the SSDs deployed in each tiers may include different types of SSDs. For example, in some embodiments, the data in the cache tier may be written on a single-level cell (SLC) type of SSD, while the capacity tier may use a quad-level cell (QLC) type of SSD for storing the data. Some embodiments may use QLC storage in the capacity tier for full segment/stripe writes simply because the write bandwidth in a QLC type of storage may be substantially lower than the read bandwidth (e.g., 400 MB/s to 2200 MB/s) and a QLC storage may be randomly written with 64 KB, or even 128 KB write without causing write amplifications. Full stripe write may also benefit TLC and other types of SSDs, because it has lower write amplification.

As described, some embodiments may allow for manual placement of object components, such as components 220a-220f, as shown in FIG. 2, or components 420a-420h, as shown in FIG. 4. In some embodiments, an object-based datastore may receive a storage policy from a user. The datastore may then determine whether it is possible to meet the policy requirements with the available storage resources. For example, the datastore may determine the number of components associated with the object based on the policy, and identify the available placement locations (e.g., storage resources) based on the policy. If the datastore is able to meet the requirements of the policy, it may offer a list of servers, disk groups, and disk drives for the first component placement to the user for selection. After the user selects the first storage resource for placement of the first component, the datastore may adjust or update the list of available component placement locations based on the user's selection. Placement locations that are not allowed based on the policy may also be removed from the list of resources for the next component selection. For example, no two components can be placed on the same host machine in a RAID-1 mirror policy, and no two disks may host the same stripe width. This component provisioning process may be repeated until all components associated with the object are assigned to a corresponding storage resource.

Figure 6:
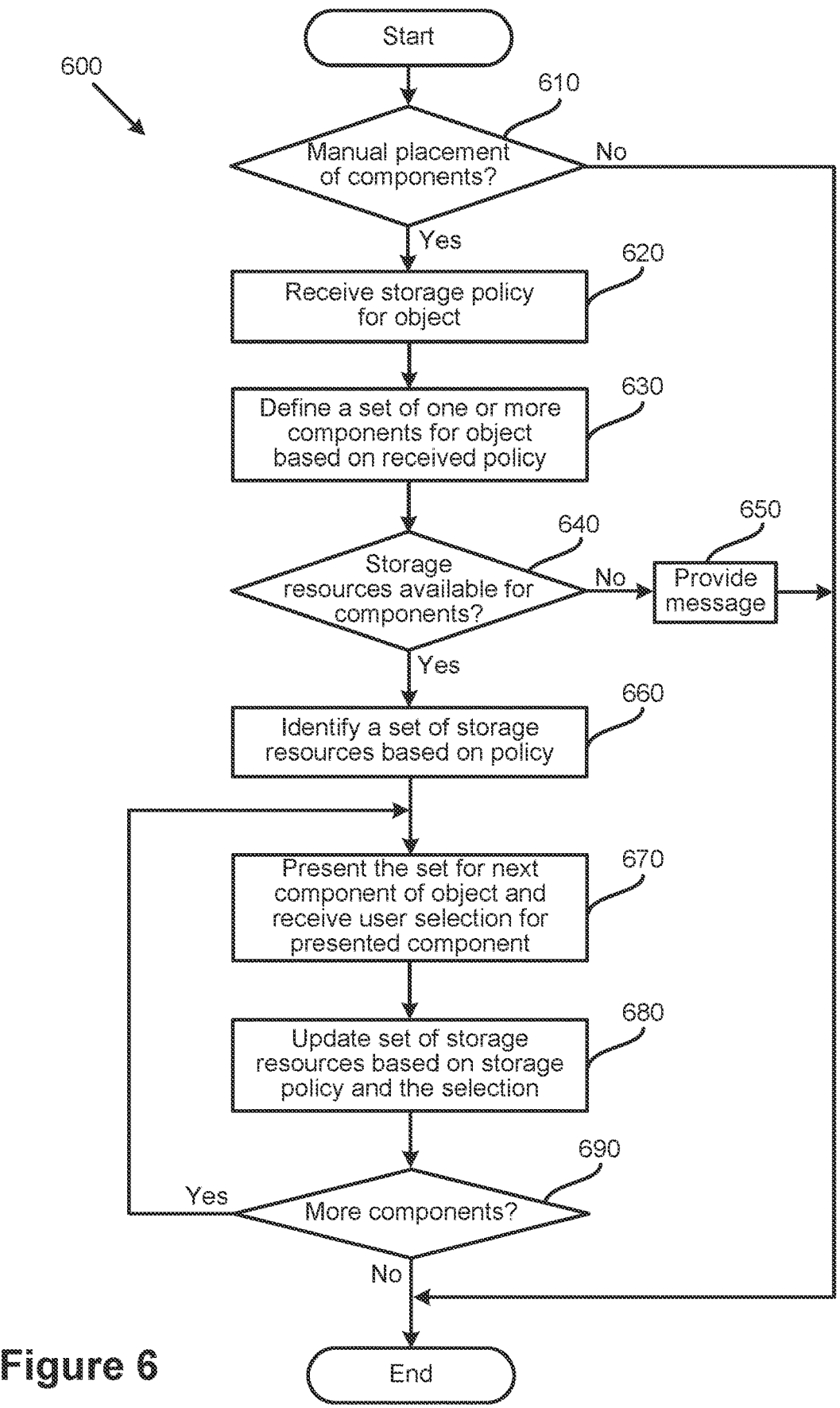
FIG. 6 is a flowchart illustrating a method (or process) for manual placement of object components within a datastore, according to an example embodiment of the present application.

FIG. 6 is a flowchart illustrating a method (or process) 600 for manual placement of object components within a datastore, according to an example embodiment of the present application. Process 600 may be performed by a datastore module such as vSAN module 114, as described above with reference to FIGS. 1-3 in some embodiments. In some other embodiments, the process may be performed by some other modules that reside in the hypervisor or outside of the hypervisor of a host machine.

Process 600 may start, at 610, by determining whether a manual placement of the components associated with an object is selected or automatic placement. In some embodiments, the datastore may provide the user, for example, through a user interface (UI), with an option to select between manual and automatic placement of the components when the user indicates that a new object (e.g., a VMDK) is to be created. For example, an option item, such as a toggle switch, may be presented to the user in the UI to select between the manual and automatic placement. In some embodiments, the default mode of placement of the components is automatic placement, which means that the datastore itself may manage the placement of the object components.

When the process determines that automatic placement of the components (e.g., the default mode) is selected, the process may end. On the other hand, when process 600 determines that manual placement is selected, the process may receive, at 620, (e.g., through another UI item(s)) a storage policy associated with the object that is to be created. Based on the received storage policy, process 600 may define or specify, at 630, a set of one or more components for the object.

Figure 7A:
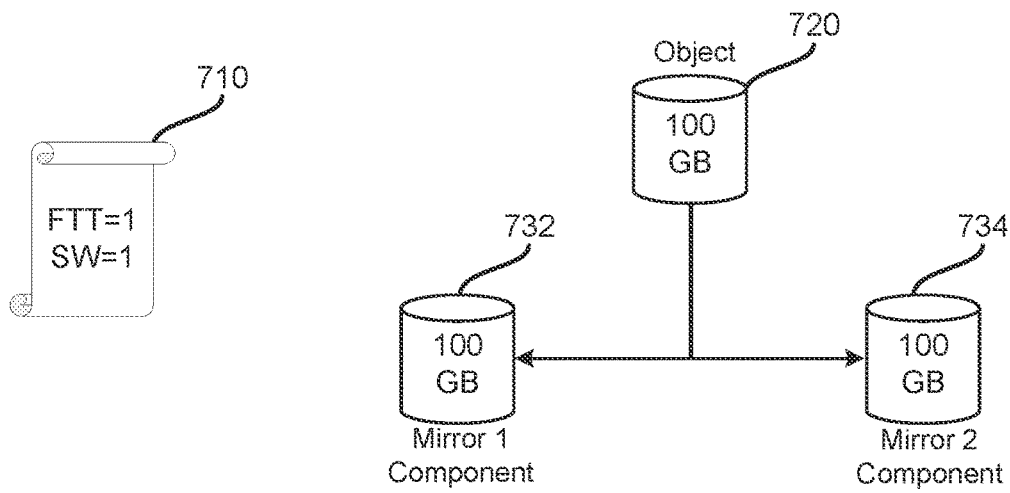
FIGS. 7A-7C illustrate creation of different object components in three different scenarios, based on three different storage policies, according to an example embodiment of the present application.
Figure 7B:
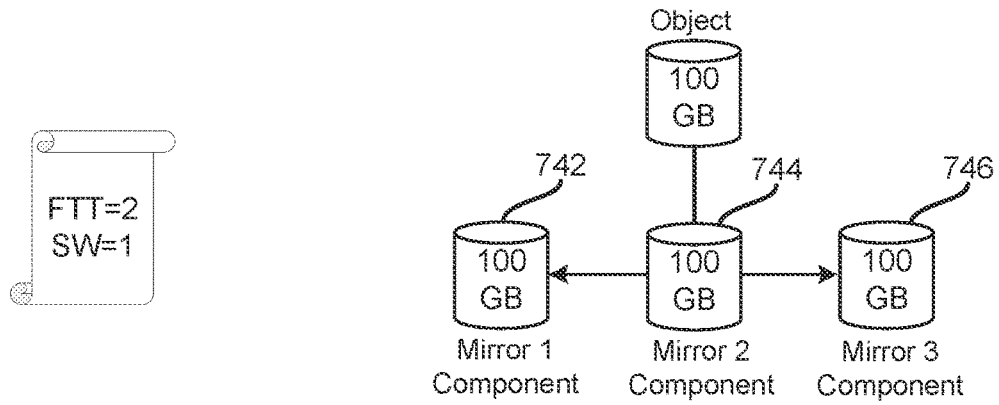
Figure 7C:
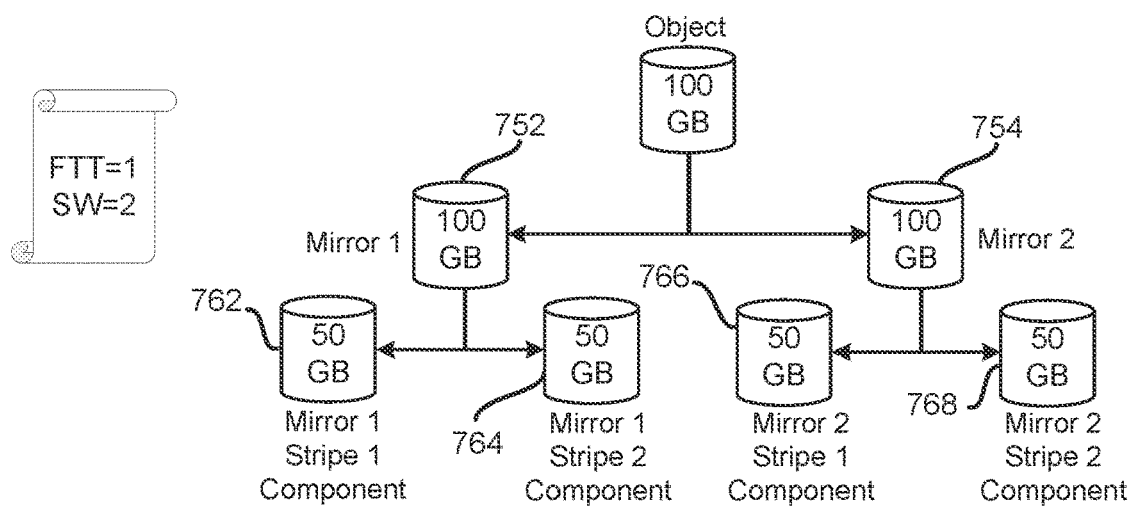

FIGS. 7A-7C illustrate creation of different object components in three different scenarios, based on three different storage policies, according to an example embodiment of the present application. More specifically, FIG. 7A shows a storage policy 710 in which the fault tolerance is defined to be 1 and the stripe width is also defined to be 1, for example, for a 100 GB VMDK object 720. As shown in the figure, the datastore may create two replica (or mirror) copies of 100 GB components, such as mirror component 732 and mirror component 734, for VMDK object 720, based on storage policy 710. Of course, mirror components 732 and 734 should be placed on two different hosts of a storage cluster, so that if one host fails, the other replica would be able to continue performing the requested I/O operations.

FIG. 7B shows a storage policy 710 in which the fault tolerance is defined to be 2 and the stripe width is defined to be 1, for example, for a 100 GB VMDK object. As shown in the figure, the datastore may create three replica (or mirror) copies of 100 GB components, such as mirror component 742, mirror component 744, and mirror component 746 for VMDK object, based on storage policy 710. As described above, mirror components 742, 744, and 746 cannot be placed on the same one or two hosts of a storage cluster in order to be able to continue performing the I/O operations in case one or even two hosts that store these components fail.

FIG. 7C shows a storage policy 710 in which the fault tolerance is defined to be 1 and the stripe width is defined to be 2, for example, for a 100 GB VMDK object. As shown in the figure, the datastore may create two replica (or mirror) copies of 100 GB sub-objects, such as mirror sub-object 752 and mirror sub-object 754, and for each of the two sub-objects may create two stripe components of 50 GB, such as mirror stripe component 762 and mirror stripe component 764 for sub-object 752, and mirror stripe component 766 and mirror stripe component 768 for sub-object 754, based on storage policy 710. Of course, each of the pairs of mirror stripe components should be placed on at least a different host machine, and at the same time, each mirror stripe component in each pair should be placed on a different disk (e.g., capacity disk) of, for example, the same host, or a disk of a different host. That is, if mirror stripe component 762 is placed on a first disk of a first host, mirror stripe component 764 should be placed either on a second disk of the first host, or a disk (e.g., any disk) of a second host.

It should be noted that other combinations of fault tolerance and stripe width may be defined in a storage policy and the datastore may similarly define one or multiple components for an object based on the different combinations of FTT and SW in the defined storage policy.

Additionally, it should be noted that fault tolerance and stripe width are not the only parameters of a storage policy and other parameters may similarly affect the number of components for an object. For example, size of the object may be another factor in determining the number of components for an object in some embodiments. That is, based on the size defined for a VMDK being above or below a threshold size limit, the number of components associated with the object may differ. For example, if the maximum size limit for a VMDK object in a datastore, such as vSAN, is defined to be 255 GB, and a user defines a size of 400 GB, the datastore may define two different components (e.g., 200 GB each) for the object. As another example, if a user (e.g., an admin) defines FTT=0, SW=1, and size=600 GB (e.g., for a datastore in which the size limit is 255 GB for an object), the datastore may assign three different components (e.g., 200 GB each) for the object. It should be noted that in the last example, a user choosing SW=3 or SW=1 does not make any difference for the datastore, since the datastore automatically defines three different components (or stripes) for the object.

Returning to FIG. 6, after defining or specifying (at 630) the components associated with the object, process 600 may determine, at 640, whether there are enough storage resources, such as host machines, disk groups within each host machine, or individual disks within each disk group, that could accommodate the components the datastore has defined based on the received storage policy. For example, if a user defines a policy for an object that requires three different host machines to store three different components of the object (e.g., FTT=2, such as the policy shown in FIG. 7B), and there are only two host machines available for accommodating the components, the datastore may determine that there are not enough storage resources available for the storage policy.

If process 600 determines that there are not enough storage resources that could accommodate the components the datastore has defined based on the received storage policy, the process may provide, at 650, a message, for example, through the UI, indicating that there are not enough available storage resources for placing the components of the defined object. The process may then end.

On the other hand, when process 600 determines that there are enough storage resources available for accommodating the components the datastore has defined based on the received storage policy, the process may identify, at 660, a set of one or more storage resources based on the policy. For example, if the policy specifies a stripe width of two and fault tolerance of one (e.g., as shown in FIG. 7C), process 600 may identify at least two different host machines from the available set of host machines that each has at least two available individual disks for placing each of the four components (e.g., two mirror pairs, as shown in FIG. 7C) of the object. Alternatively, the process may identify, for example, four different host machines from the available set of host machines that each has one available disk for placing each of the four components of the object. Other combinations of host machines and disks may be similarly identified.

At 670, process 600 may present, for example, through the UI, the next component from the identified set of one or more components of the object to the user and receive a user selection, for example, through the UI, of the storage resource for placement of the presented component. If the process is performed for the first time, of course, the presented next component would be the first component of the identified set. In some embodiments, the process may first present the available host machine, then the available disk group with the available host machine, and then the available disk within the available disk group. In some such embodiments, the user may have to make three different selections to place the presented component at the identified resource. In some other embodiments, the process may present only the available disks to the user, but also indicate to which disk group and/or host machine the presented available disk belongs. In some such embodiments, the user may make only one selection to place the component at the selected storage resource.

After receiving the selection for the storage resource, process 600 may update, at 680, the identified set of storage resources based on both the received storage policy and the selection of the user. For example, if the policy identifies two components that should be placed on two different host machines and the user has already selected a first host machine for placement of one of the components, process 600 may update the identified set of storage resources by removing the first host machine from the set. Similarly, if the policy identifies two components that should be placed on two different individual disks and the user has already selected a first disk for placement of one of the components, process 600 may update the identified set of storage resources by removing the first disk from the set. Conversely, if the policy identifies four components that each should be placed on a separate disk across at least two different host machines (e.g., such as the policy shown in FIG. 7C), and the user has already selected a first disk of a first host machine for placement of the first component, process 600 may update the identified set of storage resources by removing the first disk of the first host machine from the set. In the last example, if the user has selected first and second stripe components of a first mirror to be placed on two individual disks of two individual host machines, process 600 may update the identified set of storage resources by removing the two individual host machines from the set, such that the next pair of stripe components in the other mirror won't be placed on any of the already selected host machines.

At 690, process 600 may determine whether any more components are left in the specified set of components. If the process determines that no more components are left in the specified set of components, the process may end. On the other hand if process 600 determines that there is at least one more component in the specified set of components, the process may return to operation 670 to present the updated list of identified storage resources to the user (e.g., through the UI) and receive the user selection for placement of the next component.

The specific operations of process 600 may not be performed in the exact order shown and described. Additionally, the specific operations may not be performed in one continuous series of operations, and different specific operations may be performed in different embodiments. For example, in some embodiments, process 600 may also present an option, for example through the UI, to the user (e.g., after the placement of every component (e.g., after 690), or after placement of each component, after 670) to specify whether the placement of the component(s) can be changed, for example, in a potential future load balancing process. For example, a user may like to place all the components of a particular object on a new version of host machines (or disks) that have been recently added to the storage cluster. In such a case, a future load balancing of the objects (e.g., an automatic process performed by the datastore) may change the placement of one or more components to an older version of the host machine (or disk).

Therefore, if the user selects the option that indicates none of the placed components is moveable, any future load balancing of the objects may not change the selected placement of the components. Conversely, in some embodiments, the user may be provided with a set of storage resources to which a placed component may be moved during a future load balancing process. For example, after the user selects to place a component of the object on a particular storage resource, the user may be presented with an option that allows future movement of the component on only a particular set of storage resources (e.g., during a future load balancing process). The storage resources in the presented particular set may include newer versions of storage resources that all have been added recently to the storage system (e.g., according to the above described example).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for storage management of a first object of a datacenter among a plurality of storage devices of the datacenter, comprising:

in response to receiving an indication to use manual storage management of the first object, receiving, through a user interface (UI), a first storage policy for storing the first object, wherein the first storage policy indicates a failure to tolerance (FTT) or a stripe width associated with the first object;

based on the first storage policy, defining a first plurality of components for the first object, wherein based on the first storage policy indicating the stripe width of one and the FTT of one, the first object comprises at least two components;

determining, based on the first storage policy, a first set of one or more storage resources from a plurality of storage resources is available for storing the first plurality of components, wherein based on the first storage policy indicating the stripe width of one and the FTT of one, the first set of one or more storage resources for storing a first component of the first object includes at least two host machines; and for each of the first plurality of components of the first object:
  presenting, through the UI, the first set of one or more storage resources to select from for storing the component;
  receiving a selection of at least one of the storage resources in the first set to store the component; and
  updating the first set of one or more storage resources based on the first storage policy and the selection before presenting the updated first set of one or more storage resources to select from for storing a next component, wherein based on the first storage policy indicating the stripe width of one and the FTT of one, the updated first set of one or more storage resources for storing a second component of the first object does not include any of the two host machines that is selected to store the first component.

2. The method of claim 1, further comprising, before receiving the first storage policy:
presenting, through the UI, a selection item to select between automatic storage management or the manual storage management of the first object, wherein receiving the indication comprises receiving an input on the selection item indicating that the manual storage management is selected.

3. The method of claim 1, further comprising:
receiving, through the UI, a second storage policy for storing a second object;
based on the second storage policy, defining a second plurality of components for the second object;
determining that a second set of one or more storage resources is not available for storing the second plurality of components; and
presenting a message indicating that the second object cannot be stored based on the received second storage policy.

4. The method of claim 1, wherein the first set of one or more storage resources comprises a physical disk group or an individual physical disk.

5. The method of claim 1, further comprising:
presenting, through the UI, a second selection item to determine whether the first plurality of components are moveable from corresponding storage resources for each of the first plurality of components during a future load balancing of the storage resources.

6. A non-transitory computer readable medium comprising instructions that, when executed by one or more processors of a computing system, cause the computing system to perform a method for storage management of a first object of a datacenter among a plurality of storage devices of the datacenter, the method comprising:
in response to receiving an indication to use manual storage management of the first object, receiving, through a user interface (UI), a first storage policy for storing the first object, wherein the first storage policy indicates a failure to tolerance (FTT) or a stripe width associated with the first object;
based on the first storage policy, defining a first plurality of components for the first object, wherein based on the first storage policy indicating the stripe width of two and the FTT of one, the first object comprises at least four components;
determining, based on the first storage policy, a first set of one or more storage resources from a plurality of storage resources is available for storing the first plurality of components, wherein based on the first storage policy indicating the stripe width of two and the FTT of one, the first set of one or more storage resources for storing first and second components of the first object includes include two physical disks of one or two host machines; and
for each of the first plurality of components of the first object:
presenting, through the UI, the first set of one or more storage resources to select from for storing the component;
receiving a selection of at least one of the storage resources in the first set to store the component; and
updating the first set of one or more storage resources based on the first storage policy and the selection before presenting the updated first set of one or more storage resources to select from for storing a next component, wherein based on the first storage policy indicating the stripe width of two and the FTT of one, the updated first set of one or more storage resources for storing third and fourth components of the first object does not include the one or two host machines selected to store the first and second components.

7. The non-transitory computer readable medium of claim 6, wherein the method further comprises, before receiving the first storage policy:
presenting, through the UI, a selection item to select between automatic storage management or the manual storage management of the first object, wherein receiving the indication comprises receiving an input on the selection item indicating that the manual storage management is selected.

8. The non-transitory computer readable medium of claim 6, wherein the method further comprises:
receiving, through the UI, a second storage policy for storing a second object;
based on the second storage policy, defining a second plurality of components for the second object;
determining that a second set of one or more storage resources is not available for storing the second plurality of components; and
presenting a message indicating that the second object cannot be stored based on the received second storage policy.

9. The non-transitory computer readable medium of claim 6, wherein the first set of one or more storage resources comprises a physical disk group or an individual physical disk.

10. The non-transitory computer readable medium of claim 6, wherein the method further comprises:
presenting, through the UI, a second selection item to determine whether the first plurality of components are moveable from corresponding storage resources for each of the first plurality of components during a future load balancing of the storage resources.

11. A computer system, comprising:
a memory; and
a processor coupled to the memory, the processor being configured to:
in response to receiving an indication to use manual storage management of a first object, receive, through a user interface (UI), a first storage policy for storing the first object, wherein the first storage policy indicates a failure to tolerance (FTT) or a stripe width associated with the first object;
based on the first storage policy, define a first plurality of components for the first object, wherein based on the first storage policy indicating the stripe width of one and the FTT of one, the first object comprises at least two components;
determine, based on the first storage policy, a first set of one or more storage resources from a plurality of storage resources is available for storing the first plurality of components, wherein based on the first storage policy indicating the stripe width of one and the FTT of one, the first set of one or more storage resources for storing a first component of the first object includes at least two host machines; and for each of the first plurality of components of the first object:
present, through the UI, the first set of one or more storage resources to select from for storing the component;
receive a selection of at least one of the storage resources in the first set to store the component; and
update the first set of one or more storage resources based on the first storage policy and the selection before presenting the updated first set of one or more storage resources to select from for storing a next component, wherein based on the first storage policy indicating the stripe width of one and the FTT of one, the updated first set of one or more storage resources for storing a second component of the first object does not include any of the two host machines that is selected to store the first component.

12. The computer system of claim 11, wherein the processor is further configured to, before receiving the first storage policy:
present, through the UI, a selection item to select between automatic storage management or the manual storage management of the first object, wherein receiving the indication comprises receiving an input on the selection item indicating that the manual storage management is selected.

13. The computer system of claim 11, wherein the processor is further configured to:
receive, through the UI, a second storage policy for storing a second object;
based on the second storage policy, define a second plurality of components for the second object;
determine that a second set of one or more storage resources is not available for storing the second plurality of components; and
present a message indicating that the second object cannot be stored based on the received second storage policy.

14. The computer system of claim 11, wherein the first set of one or more storage resources comprises a physical disk group or an individual physical disk.

15. The computer system of claim 11, wherein the processor is further configured to:
present, through the UI, a second selection item to determine whether the first plurality of components are moveable from corresponding storage resources for each of the first plurality of components during a future load balancing of the storage resources.

* * * * *